Figure 1:
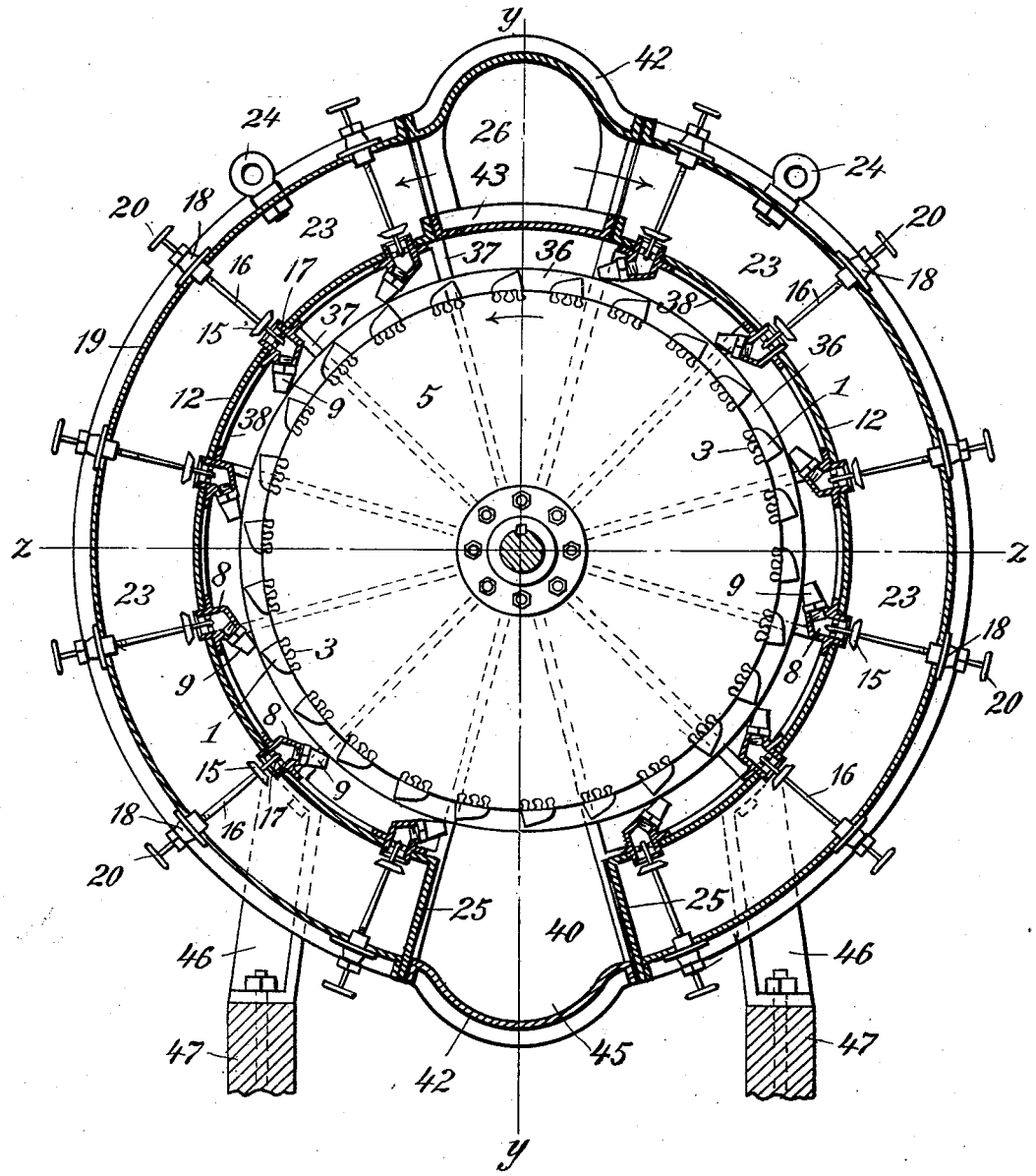

No. 756,241. PATENTED APR. 5, 1904.
C. V. KERR.
COMPOUND STEAM TURBINE.
APPLICATION FILED FEB. 24, 1903.
NO MODEL. 5 SHEETS—SHEET 1.

WITNESSES:

INVENTOR
C. V. Kerr
BY
Edward P. Thompson
ATTORNEY

No. 756,241. PATENTED APR. 5, 1904.
C. V. KERR.
COMPOUND STEAM TURBINE.
APPLICATION FILED FEB. 24, 1903.
NO MODEL. 5 SHEETS—SHEET 2.

WITNESSES:

INVENTOR
C. V. Kerr

BY
Edward P. Thompson
ATTORNEY

No. 756,241. PATENTED APR. 5, 1904.
C. V. KERR.
COMPOUND STEAM TURBINE.
APPLICATION FILED FEB. 24, 1903.
NO MODEL. 5 SHEETS—SHEET 4.
FIG. 4.
FIG. 6.
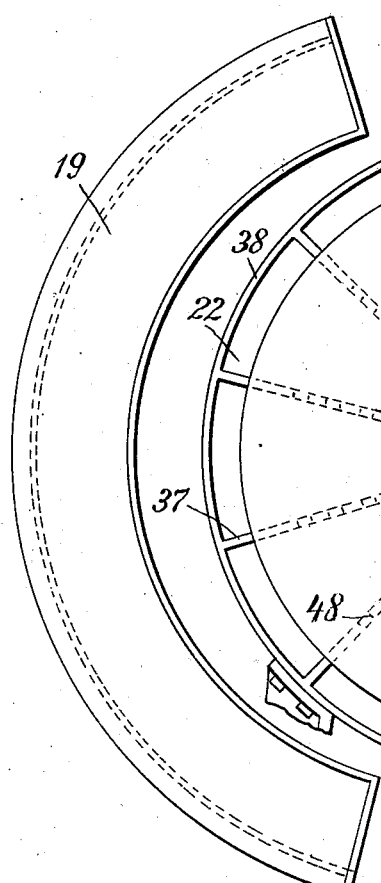
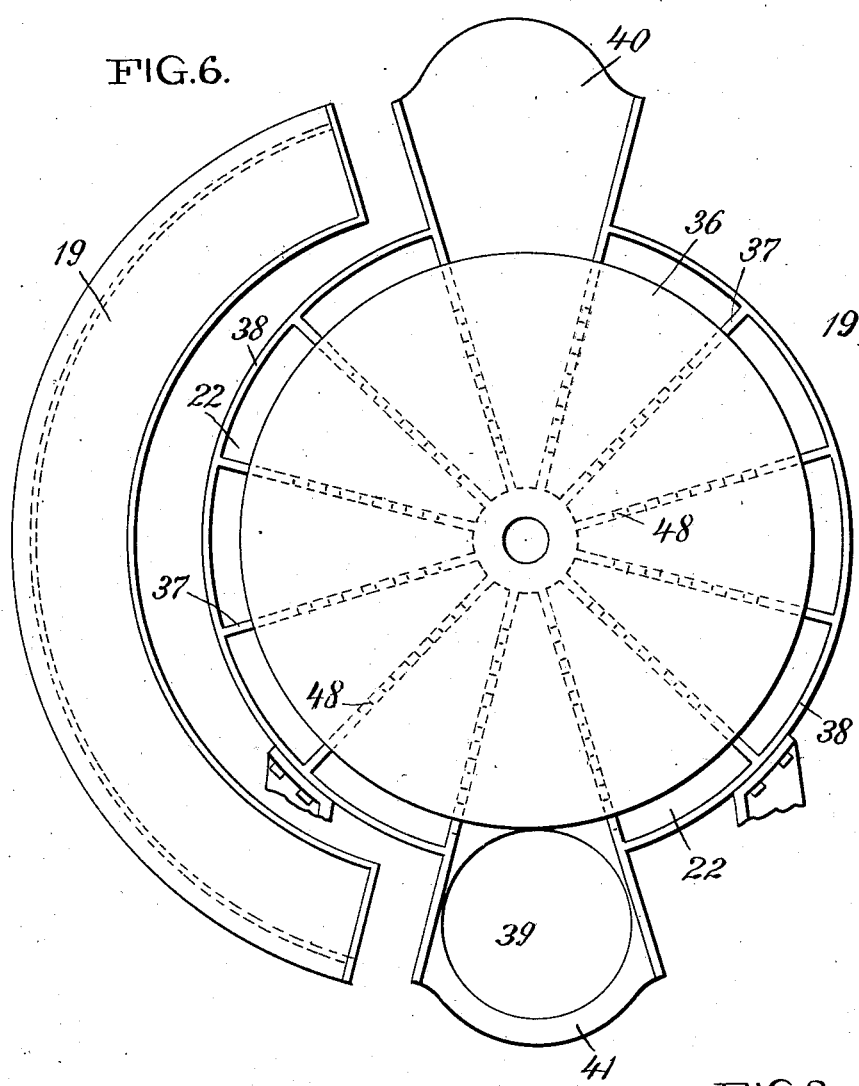
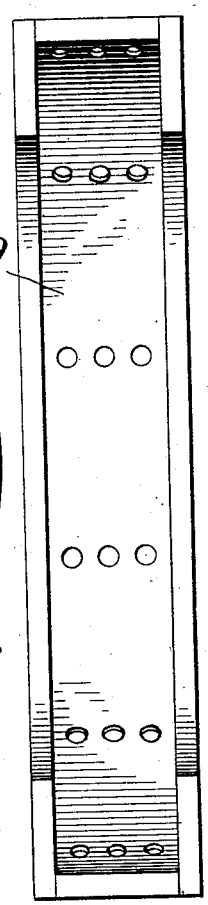
FIG. 5.
FIG. 7.
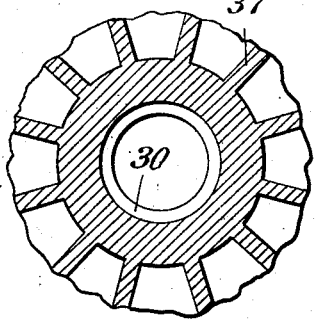
FIG. 8.
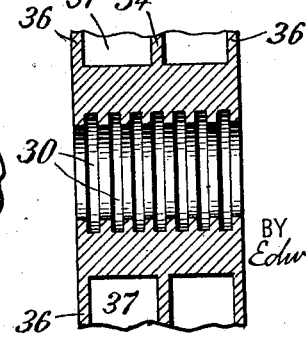
WITNESSES:
INVENTOR
C. V. Kerr
BY
Edward P. Thompson
ATTORNEY No. 756,241. PATENTED APR. 5, 1904.
C. V. KERR.
COMPOUND STEAM TURBINE.
APPLICATION FILED FEB. 24, 1903.
NO MODEL. 5 SHEETS—SHEET 5.

WITNESSES:
Anna R. McCole
E. W. Kelly

INVENTOR.
C. V. Kerr.

BY
Edward P. Thompson
ATTORNEY

No. 756,241. Patented April 5, 1904.

UNITED STATES PATENT OFFICE.

CHARLES V. KERR, OF RUTHERFORD, NEW JERSEY.

COMPOUND STEAM-TURBINE.

SPECIFICATION forming part of Letters Patent No. 756,241, dated April 5, 1904.

Application filed February 24, 1903. Serial No. 144,799. (No model.)

*To all whom it may concern:*

Be it known that I, CHARLES V. KERR, a citizen of the United States of America, and a resident of Rutherford, in the county of Bergen and State of New Jersey, have invented certain new and useful Improvements in Compound Steam-Turbines, of which the following is a specification.

My object is to produce a compact steam-turbine of low rotative speed and large horse-power. As a feature in the general arrangement and as distinguished from vanes I employ movable buckets for receiving the impulse of the steam, which is delivered to them in jets through expansion-nozzles. The form of bucket used is of the type commonly found in the Pelton form of water-motor, but has special features designed to adapt it for use with steam. The nozzles used come under what is known as "expansion-nozzles;" but the steam is not expanded clear down at one stage. The movable buckets are arranged in sets, and each set is inclosed in a separate steam-tight cylinder or chamber, and the nozzles are also likewise arranged, one group or set of nozzles for each cylinder. The first set of nozzles delivers steam-jets into the first cylinder against a steam atmosphere having a pressure which is one stage lower than the boiler-pressure. The nozzles of the second set receive their supply of steam from the first cylinder and expand it again into a second cylinder against a second steam atmosphere of a pressure yet a stage lower, and so on through as many stages as it is desired to employ. At the last stage the steam is expanded clear down to atmospheric pressure or to vacuum, as the case may be, a slight pressure only being left in the steam to clear the passages and prevent choking. As only a fractional portion of the total or absolute pressure of the steam is converted into velocity at each stage, the expansion-tips of the nozzles are correspondingly shorter than if it were desired to convert all of the pressure into velocity at one operation. If all the pressure were converted into velocity at one operation in order to properly utilize it in motors of large horse-power, the rotative speed would be so high as to disrupt the machine by centrifugal force. By expanding the steam through successive stages I secure a lower jet velocity, which admits without loss of a correspondingly lower bucket speed. The bucket I employ is in the form of two intersecting and partly-intercommunicating cups having rounded bottoms. At the point of intersection of the two cups a wedge results, which splits each steam-jet into two independent streams and turns them back almost in an opposite direction. It is calculated that the speed of the buckets shall be half that of the jets, which secures maximum efficiency, and the exhaust from the buckets is stationary in respect to the casing or cylinder. The buckets are attached to the periphery of disks which are secured to a common shaft passing through all the cylinders. There are several nozzles for each disk arranged in a circle around the same and delivering the steam-jets tangentially to the succession of buckets. There may be one or more bucket-bearing disks in each cylinder, and it is preferred to increase the number of disks as the low-pressure side is approached in order to accommodate the increased volume of steam without making the buckets and nozzles so large. Also a convenient way to increase the horse-power is simply to increase the number of bucket-bearing disks and sets of nozzles for each cylinder, other dimensions remaining the same. Each set of nozzles is supplied with steam from arc-shaped steam-chests, which partly inclose each cylinder and each of which, except those for the first cylinder, receives exhaust-steam from the preceding cylinder.

Briefly summed up, my invention consists in two or more sets of rotating buckets, which are so shaped as to split each jet of steam into two independent streams and to reflect said streams, each set being single or multiple, of a series of steam-tight cylinders or shells inclosing the sets of buckets, there being one set within each cylinder, a series of steam-chests, one for each cylinder, the first chest receiving boiler-steam and each of the others receiving steam from the preceding cylinder, a set of expansion-nozzles taking steam from the first steam-chest and delivering jets to the impulse-buckets within the first cylinder, a second set of nozzles receiving steam from the second chest and delivering jets to the buckets within the second cylinder, and so on through each successive stage to the last cylinder, which has a final exhaust, each of the above-mentioned sets of nozzles being adapted to convert in successive operations or stages different portions of the pressure of the steam into velocity, all of the difference in pressure between that of any one stage and that of the next lower being thus converted and each set of buckets being adapted to abstract all of the velocity developed at that stage, thus the steam-pressure being alternately converted into velocity and the velocity abstracted in stages.

My invention comprises also certain details of construction, which appear later in this description.

Figure 2:
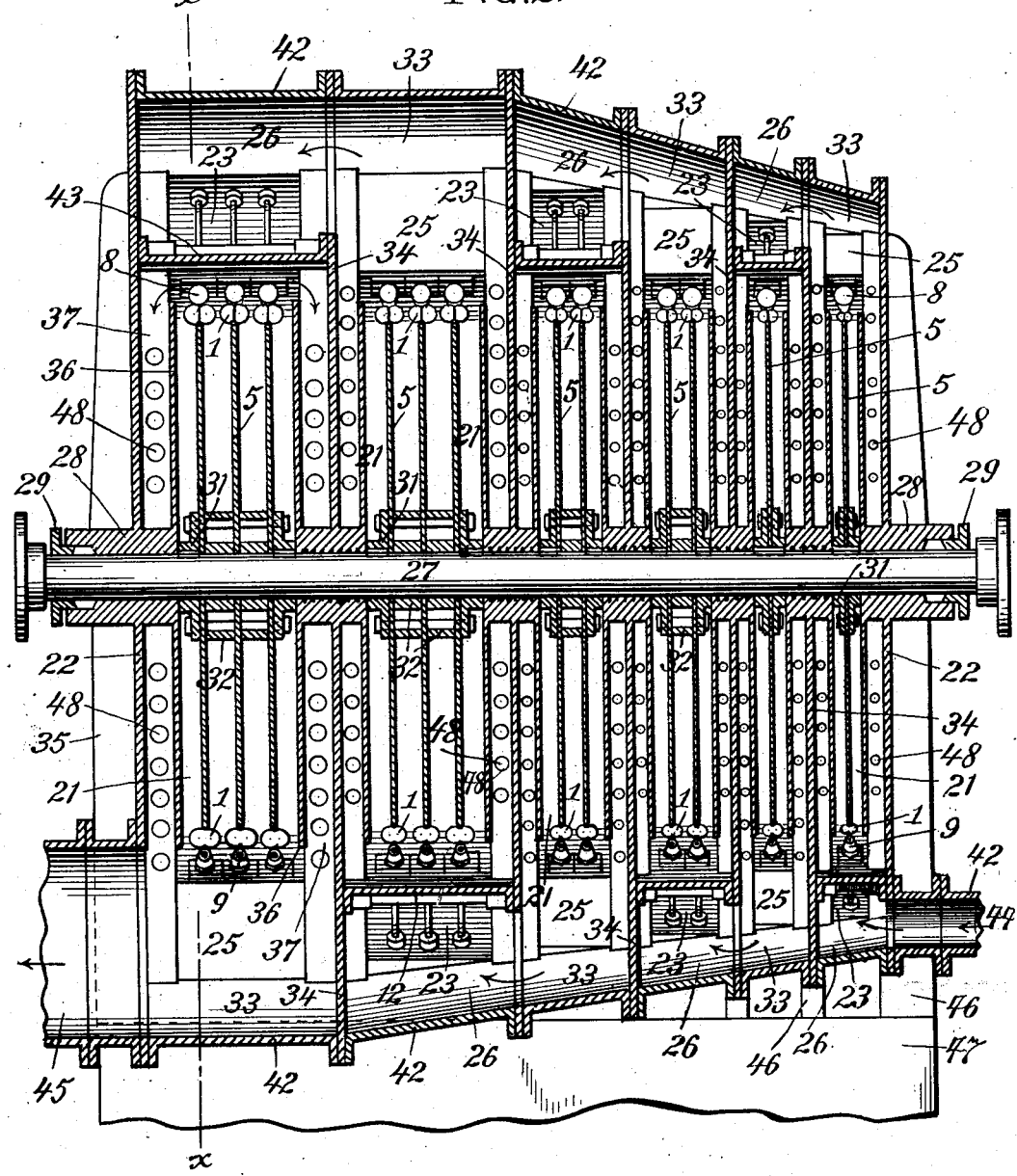
Figure 3:
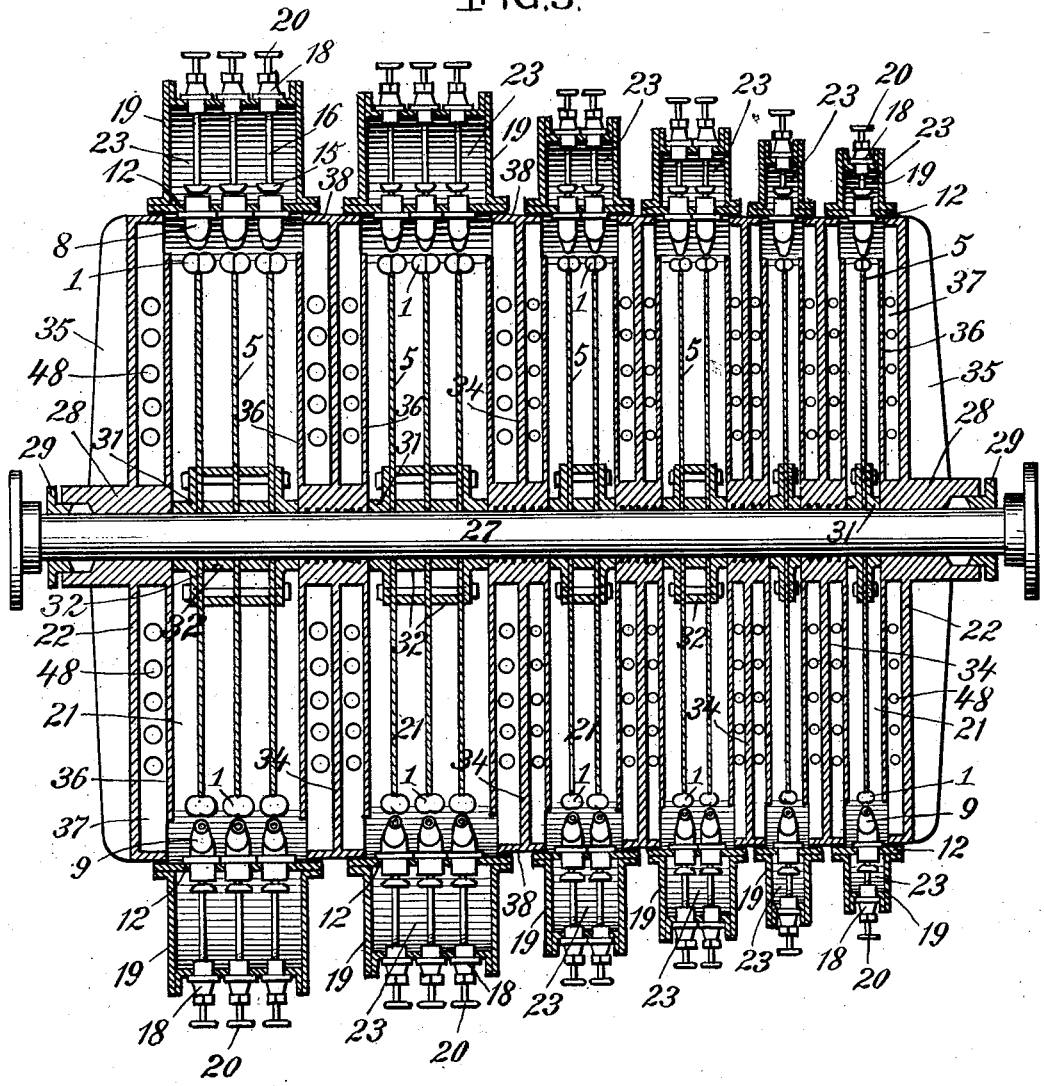
Figure 9:
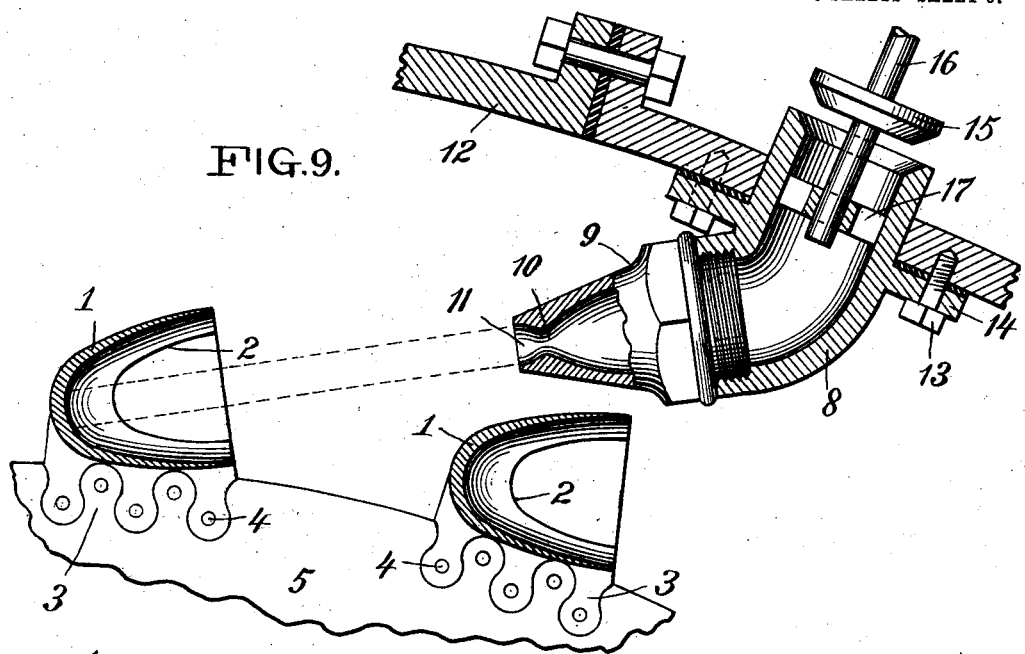
Figure 10:
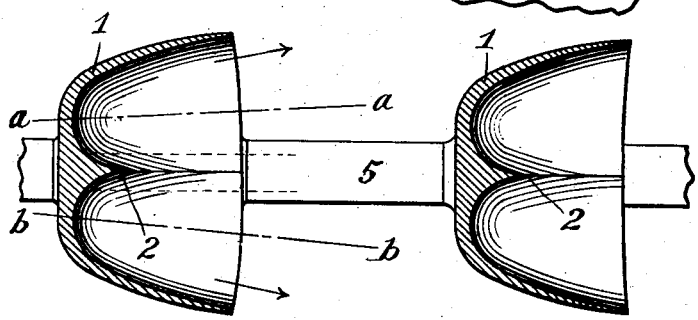
Figure 11:
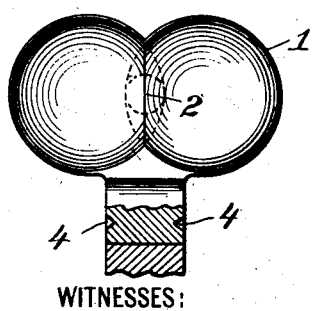
Figure 12:
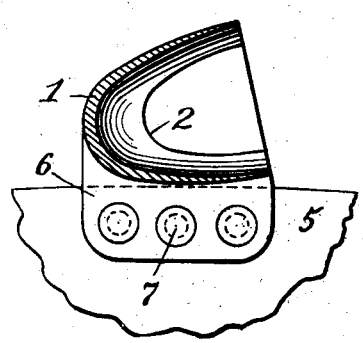
Figure 13:
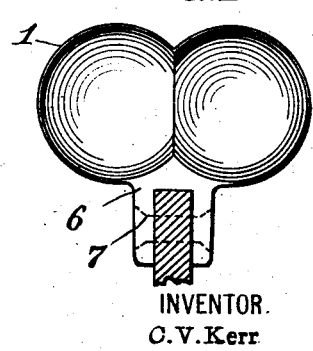

Figure 1 is a transverse section through a steam-turbine of my construction on the line $xx$ of Fig. 2. Fig. 2 is a longitudinal section of the complete turbine on a vertical plane represented by the line $yy$ in Fig. 1. Fig. 3 is a longitudinal section of the complete turbine on a horizontal plane represented by the line $zz$ in Fig. 1. Fig. 4 is a view of the inner side of the last or outside cylinder-head on the low-pressure side, (designated in Figs. 2 and 3 by the numeral 22.) Fig. 5 shows one of the steam-chest casings isolated and viewed from the inside, the valve-stems being removed. Fig. 6 is a side view of the steam-chest casing shown in Fig. 5. Fig. 7 is a transverse section through the central part of one of the interior cylinder-heads. Fig. 8 is a longitudinal section of the same part shown in Fig. 7. Fig. 9 is an enlarged view of a small portion of one of the cylinders in transverse section, showing in section and relative position one of the nozzles and two of the buckets and showing the manner in which the nozzles and the buckets are attached. Fig. 10 is a transverse section through two of the buckets in attached position. Fig. 11 is a front view of one of the buckets, showing partly in section the manner of attachment to the disks. Fig. 12 is a side sectional view of a bucket and a fragment of a disk and shows a modified form of attachment to the disks. Fig. 13 is the same as Fig. 12, but a front view showing a fragment of disk in section.

The impulse-buckets 1, as will be noticed by the drawings, have somewhat the form of the Pelton water-wheel bucket; but in order to adapt them for use with steam I have devised a special form. These buckets must be very strong and light and perfectly smooth on the inside. To this end I contemplate drop-forging the buckets from a high grade of steel, probably nickel-steel, and the inside will be bored out perfectly smooth by a tool after the order of a milling-cutter. In order that the bucket can be thus bored out, it is necessary that each side of the bucket—that is, each recess on either side of the dividing-wedge 2—shall in contour represent a surface of revolution. Hence the working face of each bucket is made up of two intersecting surfaces of revolution, and the wedge 2 is the result of such intersection. The curves of the interior of the bucket in a transverse direction as they are always parts of a surface of revolution of course must be circles in whole or part; but the curve in the opposite or longitudinal direction may be anything desired—as circle, ellipse, hyperbola, parabola, cycloid, or a curve without a name; but I prefer about the curve shown in the drawings, which is that of a somewhat-elongated ellipse. It is preferable to have the sharpest curve at the bottom of each recess, because the wear from steam friction can be best taken care of at that point. The sides of the buckets are either made slightly flaring, or, preferably, as shown in the drawings, the axes $aa$ and $bb$ of the two intersecting surfaces of revolution diverge slightly from each other in the direction of the mouth of the bucket.

In order to withstand the great strain, the buckets 1 must be very securely attached, and I prefer to dovetail them to the periphery of the disk 5, as shown at 3. The form of these dovetails is carefully calculated, so that the shearing strain of the head portions will equal the breaking strain at the neck portions, thus giving the total greatest strength. In order to retain the dovetails firmly in place and add greater strength, their contact-surfaces are electrically welded together, or else the ends of the dovetails are slightly swelled or upset, as indicated at 4; but I prefer the weld. At 6 is shown a modified attachment of the buckets to the disks by means of rivets 7.

Each nozzle 8 has a removable tip 9, which tip is contracted to form a throat 10 and then enlarged to form an expansion-tip 11. As the steam is expanded and converted into velocity at successive stages—in part at each stage—the expansion-tip 11 is rather short, it being intended as nearly as possible to secure maximum flow of steam through the nozzles. As will be noted by the drawings, the expansion-tip 11 flares outward from the throat 10; but its walls curve, so that at the point of delivery of the jet they are parallel to each other. The nozzles 8 are attached to the inside of the cylinder-shells 12 by screw-bolts 13 passing through annular flanges 14. Each nozzle is controlled by a manually-operated valve 15, which has a stem 16, whose inner end is guided by a spider 17 and whose outer end passes through a gland 18, situated in the steam-chest casing 19, and terminates on the outside thereof in a handle 20.

The number of stages may vary in different machines according to the varying requirements; but the turbine shown in the drawings has six stages, (represented by the six cylinders 21.) Each cylinder has end walls 22 and a peripheral shell 12. Almost completely surrounding each cylinder are steam-chests 23, formed by attaching the open-sided casings 19 to the outside of the cylinder-shells 12. These chest-casings may be either each in one piece or built up, as shown. One of these casings 19 is fitted to the opposite sides of each cylinder, and each casing is made easily detachable and removable. To facilitate handling the detached casing by means of a crane or otherwise, the eyes 24 are provided. The ends of the curved steam-chest are closed by the walls 25, which are in one piece with the cylinder-shell 12, and each chest communicates with an admission-port 26.

The end walls 22 and 34 of the cylinders are all apertured through their centers for the passage of a shaft 27, and this shaft is provided with bearings 28 and packing-glands 29 in the exposed cylinder ends 22. The interior cylinder ends 34 have a fluid-packing surrounding the shaft and contained in the circular grooves 30. Within each cylinder nave or hub pieces 31 are keyed to the shaft, and the bucket disks are clamped between and secured to these hub-pieces by bolts or rivets, as shown. In the cylinders which have more than one bucket-disk the disks are spaced apart from each other on the shaft by annular distance-blocks 32. In the turbine shown the first two cylinders have each one disk, the following two have two disks each, while the last two cylinders in the series are provided each with three disks. These disks are all of the same diameter and each carries on its periphery a succession of my heretofore-described specially-devised buckets.

Each cylinder has an exhaust-port 33, which is formed between the walls 25 of the ends of its steam-chest, and each exhaust-port, except of course the final one, opens directly into the admission-port belonging to the next lower stage. It will be observed that the admission and exhaust ports of each successive stage appear alternately on opposite sides of the machine. The cylinder ends 22 are provided on their outside with stiffening-ribs 35. The cylinder ends 34 have on either side thereof and the ends 22 have on their inner sides plates 36, spaced apart therefrom by perforated radial webs 37, the said plates and webs being formed integral with the cylinder ends, as shown. The webs 37 extend radially out from the center to the periphery of the cylinder ends, where they connect with the flanges 38. Each plate 36 is of a smaller diameter than the cylinder interiorly, so that an annular opening is left all around its edge, which opening communicates on the one hand with the interior of the cylinder and on the other with the space behind the plate between the perforated webs. The cylinder ends 22 and 34 have projecting portions 40 and 41 and an opening 39. In the ends 34 the projection 40 forms a partition between the different stages, and the opening 39 forms a communication from the exhaust-passage of one stage to the admission-port of the next succeeding stage. In the ends 22 the projection 40 closes the steam-passages, and the opening 39 represents either the initial inlet or the final exhaust, as the case may be. At 42 is indicated the outside walls of the exhaust and inlet passages. The passage-walls 42 are secured between the opposing ends of the steam-chest casings 19 and are also secured between the edges of the cylinder ends. It will be noticed that the circumference of each cylinder is made up of three pieces, the two side pieces 12 12 and the middle piece 43, all of which are secured together and to the respective cylinder ends 22 and 34, and that the ends 25 of the pieces 12 are secured between the edges of one of the curved plates 42 and the ends of the steam-chest casings 19.

Each cylinder is provided with one circular row of nozzles for each disk. These nozzles communicate with the steam-chest and open into the cylinder in a direction tangential to the disks and toward the mouth or working face of the buckets. All the nozzles and buckets are alike except in size. Both nozzles and buckets grow progressively larger from stage to stage from the high toward the low pressure side. There are preferably the same number of nozzles in each circular row; but the number of rows for each stage, and correspondingly the number of bucket-disks in each cylinder, are increased toward the low-pressure side. The relative size, number, and proportions of the nozzles is such that the steam is delivered to the buckets approximately at the same velocity in all of the cylinders. The initial-inlet passage for the system is indicated at 44, and the final-exhaust passage is shown at 45. At 46 is shown supports for the machine secured thereto and resting upon a base 47.

The drawings in the case are made according to calculations for a machine of ten thousand electrical horse-power, with bucket-disks eight feet in diameter, the initial inlet pipe or passage of eight inches diameter, and the final exhaust thirty-six, it being intended to use steam at two hundred pounds pressure and expand it down to about two pounds (absolute) at the final exhaust. The absolute pressure at each different stage would be as follows: two hundred, one hundred, fifty, twenty-four, eleven, five. The working pressure available at each stage would be represented by the difference in pressure between that stage and the next lower. With the above figures this would be represented by one hundred, fifty, twenty-six, thirteen, six, and three. In this connection it must be remembered that according to the laws governing the expansion of gases when the pressure is reduced, say, one-half the volume is doubled. By this with scarcely no calculation it will be seen that practically the same amount of power is available in the steam at each successive stage indicated above. The pressure at each stage is converted into velocity and the velocity into mechanical rotation. Each set of nozzles, though delivering a different volume of steam, necessarily delivers the same quantity (barring loss from condensation, if any) as any one of the other sets, and all the nozzles 8 in the machine in the turbine shown are intended to deliver their jets at the same velocity, which is calculated to be fifteen hundred feet per second. As the bucket-disks 5 are all of the same diameter and all secured to a common shaft 27, it is apparent that the rate of movement of all the buckets 1 must be equal, and their velocity is intended to be seven hundred and fifty feet per second or just half that of the jets. From this it is seen that the exhaust-steam issuing from the buckets 1 is stationary with respect to the stationary parts 12 22 25 34, &c., of the machine. In other words, all its kinetic energy has been abstracted and transferred to the buckets. The nozzles 8 convert all the pressure at any one stage into velocity and the buckets abstract that velocity. From what has been said we see that the same number of horse-power is developed at each stage. Each steam-chest of the lower and intermediate stages is virtually a common chamber with the next preceding cylinder. Each of these chests is supplied with exhaust-steam from the stage above in the same manner that the first chest in the series is supplied from the boiler, and the nozzles of the lower and intermediate stages use steam from their chests in precisely the same manner that the nozzles in the first stage use boiler-steam from the first chest. Thus it is seen that each steam-chest acts as a reservoir, holding steam under pressure and supplying it to the nozzles as needed.

The interior parallel sides 11 of the extreme tip of the nozzle give the jet a parallel flow. This is desirable in order that all portions of the jet shall strike the bucket at the most effective angle, also in order that the solidity of the jet may be preserved, for if it were divergent it would have a tendency to split up and form eddies. When a jet flows against the wedge in the bucket, it is gradually divided and a portion turned back along either side. Were there no wedge, the steam would have a tendency to pile up in the bottom of the bucket and to form eddies. The principle here involved is the same as in the case of impulse-buckets for water which have a dividing-wedge.

On account of the interior of the buckets being made up of surfaces of revolution they can be dressed by means of revolving tools to extreme smoothness, offering very little friction to the flow of the steam. As the axes $a\ a$ and $b\ b$ of the two surfaces of revolution are slightly divergent, the delivery sides of the buckets are caused to flare slightly outward, thus delivering the exhaust outside of the path of the following bucket. As the steam escapes from the buckets it passes through the annular openings around the plates 36 into the space behind these plates, where it finds its way through the holes 48 in the webs 37 to the exhaust-passages 33. The manner in which the cylinder ends 22 and 34 are constructed gives not only great strength and rigidity, but provides passages 44 for the exhaust.

As there is considerable difference in pressure between the different cylinders 21, especially toward the high-pressure side, unless it were provided against steam would leak from one cylinder 21 to another 21 along the shaft 27. To guard against this, the shaft is made to fit as closely as possible in the openings through the cylinder-heads, and also circular grooves 30 are provided on the inside of the openings, which will collect and hold water and oil, and thus provide a packing. High-pressure steam from the pipe 44 enters the admission-port 26 of the first steam-chest 23, is distributed to the first set of nozzles in the series, and exhausts from the first cylinder through its port 33 diametrically opposite to the inlet 26, passes through the admission-port 26 of the second steam-chest 23, through the second set of nozzles in the series, and exhausts from the second cylinder 21 through its port 33 opposite to the second admission-port 26, and so on through all of the cylinders 21, the admission and exhaust ports 26 and 33 being alternately opposite and connecting with each other.

A proper relation or balance of pressures in the different cylinders, and consequently the proper distribution among them of the power developed, may be maintained by shutting off any desired number of the nozzles which deliver steam to any one or more of the cylinders. Condensation in the engine is reduced to a minimum by the use of highly-superheated steam. The interior of the machine may be readily inspected for repairs by simply lifting off any one of the side sections of the steam-chests, including the casings 19 and 12 and nozzles and valves altogether, thereby exposing the bucket-disks 5 throughout their entire circumference.

By the divergence of the axes $a\ a$ and $b\ b$ the steam issuing from one bucket is prevented from blowing against the following bucket.

I claim as my invention—

1. In a compound steam-turbine, the combination of a series of steam-cylinders for the several stages of expansion; a set of rotary disks within each cylinder, the disks in the successive cylinders progressively increasing in number from the high-pressure stage to the low-pressure stage of expansion; a row of buckets on the periphery of each disk; and a set of stationary nozzles opposite each row of buckets and extending into said cylinders.

2. In a compound steam-turbine, the combination of a series of steam-cylinders for the several stages of expansion; a set of rotary disks within each cylinder, the disks in the successive cylinders progressively increasing in number from the high-pressure stage to the low-pressure stage of expansion; a row of buckets on the periphery of each disk; a set of stationary nozzles opposite each row of buckets and extending into said cylinders, the end walls of said cylinders forming the end walls of contiguous cylinders; a steam-chest for each cylinder and communicating therewith through said nozzles; a shaft extending through all the cylinders; and exhaust-ports formed in the end walls of said cylinders and passages both for respectively forming steam communication between any cylinder and the next succeeding steam-chest.

3. In a compound steam-turbine, the combination of a series of steam-cylinders for the several stages of expansion; a set of rotary disks within each cylinder, the disks in the successive cylinders progressively increasing in number from the high-pressure stage to the low-pressure stage of expansion; a row of buckets on the periphery of each disk; a set of stationary nozzles opposite each row of buckets and extending into said cylinders, the end walls of said cylinders forming the end walls of contiguous cylinders; a steam-chest for each cylinder and communicating therewith through said nozzles; a shaft extending through all the cylinders; and exhaust-ports formed in the end walls of said cylinders and passages both for respectively forming steam communication between any cylinder and the next succeeding steam-chest, said steam-chests being in detachable sections, and said passages being respectively located between the ends of said sections.

4. In a compound steam-turbine, the combination of a series of adjoining cylinders belonging to the several stages of expansion and containing steam at different pressures; cylinder-walls which are common to adjoining cylinders; a rotating shaft extending through all the cylinders; axial openings in said cylinder-walls slightly larger than said shaft; annular grooves on the interior face of said axial openings; and a fluid packing contained in said grooves consisting of a mixture of steam or water and oil in varying proportions.

5. In a compound steam-turbine, the combination of a series of adjoining cylinders; arc-shaped steam-chests in detachable sections partly inclosing said cylinders; stationary nozzles supported by said steam-chests and projecting into said cylinders; a rotating shaft extending through all the cylinders; a set of disks mounted on said shaft within each cylinder, the number of disks in the set progressively increasing from the high-pressure to the low-pressure cylinders; a succession of buckets on the rim of each disk, the working face of each bucket being formed of two intersecting surfaces of revolution and a dividing-wedge traversing each bucket in the plane of the supporting-disk, the contour of said dividing-wedge being determined by the intersection of said surfaces of revolution, said nozzles being disposed approximately tangential to said disks and opposite to the working face of said buckets.

6. In a compound steam-turbine, the combination of a series of cylinders containing steam of different and successively-decreasing pressures; rotating disks within each cylinder, the disks in the successive cylinders progressively increasing in number from the high-pressure to the low-pressure stages of expansion; buckets on the rim of each disk, said buckets being so shaped and placed as to divide a jet of steam and deflect it in two divergent streams; arc-shaped steam-chests formed in detachable sections partly inclosing said cylinders; a set of stationary nozzles for each disk supported by said steam-chests, said nozzles having throats terminating in a diverging mouth.

7. In a compound steam-turbine, the combination of a series of steam-cylinders for the several stages of expansion; a set of rotary disks within each cylinder, the disks in the successive cylinders progressively increasing in number from the high-pressure stage to the low-pressure stage of expansion; a row of buckets on the periphery of each disk; a set of stationary nozzles opposite each row of buckets and extending into said cylinders; and valves for separately and individually controlling said nozzles.

8. In a compound steam-turbine, the combination of a series of steam-tight cylinders, for successively containing steam of lower and lower pressures for the several stages of expansion of said steam; a wall between every two cylinders; arc-shaped steam-chests; a shaft passing through said cylinders, which are successively wider and wider in the longitudinal direction of said shaft; disks fixed to said shaft and located in said cylinders in groups, the number of disks in said groups progressively increasing in the successively wider and wider cylinders; a row of buckets fastened on the rim of each disk; nozzles for delivering steam to said buckets and communicating between said chests and said cylinders; a separate valve for each nozzle, and handles for the valves extending to the outside of said chests.

9. In a compound steam-turbine, the combination of a series of cylinders containing steam of successively-decreasing pressures; a shaft passing through all the cylinders; rotating disks within each cylinder mounted on said shaft, the number of disks in each cylinder progressively increasing for the lower stages of expansion; a succession of buckets on the rim of each disk; arc-shaped steam-chests partly encircling each of said cylinders; stationary nozzles for delivering steam to said buckets by communicating between said chests and said cylinders; and dividing-walls between the cylinders formed of plates spaced apart by radially-diverging webs.

10. In a compound steam-turbine, the combination of a series of cylinders belonging to the several stages of expansion; a rotating shaft extending through all the cylinders; a set of disks within each cylinder secured to said shaft; a series of stationary nozzles; buckets adapted to receive jets of steam from said nozzles; dovetails projecting from one side of said buckets; similar dovetails in the edge of each of said disks arranged to engage the first-named dovetails; and means for bringing the two sets of dovetails into close and firm contact, thereby securing said buckets to said disks.

11. In a compound steam-turbine, the combination of a series of cylinders for the several stages of expansion; a shaft passing through all the cylinders; a set of rotating disks within each cylinder mounted on said shaft; a succession of buckets on the rim of each disk; arc-shaped steam-chests formed in detachable sections and partly inclosing each of said cylinders; stationary nozzles opposite each rotating disk, said nozzles being supported by said steam-chests and projecting into said cylinders; and a valve for each nozzle, the stem of said valve extending to the outside of said steam-chest.

In testimony whereof I have hereunto set my hand and seal this 20th day of February, 1903.

CHARLES V. KERR. [L. S.]

Witnesses:
ELIZABETH A. KERR,
IRWIN J. MACOMBER.